United States Patent
Hrdina et al.

(10) Patent No.: US 8,021,755 B2
(45) Date of Patent: Sep. 20, 2011

(54) LOW THERMAL EXPANSION GLASS FOR EUVL APPLICATIONS

(75) Inventors: Kenneth Edward Hrdina, Horseheads, NY (US); Michael A Mueller, Roth (DE); Barbara L Stainbrook, Lawrenceville, PA (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/862,965

(22) Filed: Aug. 25, 2010

(65) Prior Publication Data

US 2011/0052869 A1 Mar. 3, 2011

Related U.S. Application Data

(60) Provisional application No. 61/237,895, filed on Aug. 28, 2009.

(51) Int. Cl.
*B32B 17/06* (2006.01)

(52) U.S. Cl. ........ 428/428; 428/426; 428/432; 428/701; 428/702

(58) Field of Classification Search .................. 428/426, 428/702, 428, 432, 701
See application file for complete search history.

(56) References Cited

U.S. PATENT DOCUMENTS

| | | | | |
|---|---|---|---|---|
| 3,690,855 A | * | 9/1972 | Schultz | 65/117 |
| 4,184,860 A | * | 1/1980 | Schneider et al. | 65/421 |
| 5,067,975 A | * | 11/1991 | Backer et al. | 65/413 |
| 5,140,665 A | * | 8/1992 | Backer et al. | 385/126 |
| 5,180,411 A | * | 1/1993 | Backer et al. | 65/422 |
| 5,318,613 A | * | 6/1994 | Amos et al. | 65/421 |
| 6,189,340 B1 | * | 2/2001 | Burke et al. | 65/399 |
| 7,589,040 B2 | * | 9/2009 | Dawes et al. | 501/54 |
| 7,683,450 B2 | * | 3/2010 | Hart et al. | 257/432 |
| 2002/0157421 A1 | * | 10/2002 | Ackerman et al. | 65/17.6 |
| 2003/0142942 A1 | * | 7/2003 | Okano et al. | 385/129 |
| 2003/0226377 A1 | * | 12/2003 | Barrett et al. | 65/17.4 |
| 2007/0134566 A1 | * | 6/2007 | Maida et al. | 430/5 |
| 2007/0207911 A1 | * | 9/2007 | Koike et al. | 501/54 |
| 2007/0263281 A1 | * | 11/2007 | Maxon et al. | 359/352 |
| 2008/0132150 A1 | * | 6/2008 | Arserio et al. | 451/36 |
| 2009/0143213 A1 | * | 6/2009 | Hrdina et al. | 501/53 |
| 2009/0233192 A1 | * | 9/2009 | Otsuka et al. | 430/5 |

* cited by examiner

*Primary Examiner* — Jennifer McNeil
*Assistant Examiner* — Lauren Robinson
(74) *Attorney, Agent, or Firm* — Walter M. Douglas

(57) ABSTRACT

A low thermal expansion glass includes a base glass material having a front surface, a back surface, and a thickness and a glass coating material applied on at least the front surface of the base glass material. The base glass material consists essentially 10 wt % to 20 wt % titania and 80 wt % to 90 wt % silica. The glass coating material also consists essentially of titania and silica, but the total amount of titania in the glass coating material is lower than the total amount of titania in the base glass material. A silica-titania glass element suitable for extreme ultraviolet lithography applications consists of 12 wt % to 20 wt % titania and 80 wt % to 88 wt % silica and has a coefficient of thermal expansion of essentially 0 $\Delta L/L$ in a temperature range of $-20°$ C. to $+100°$ C.

19 Claims, 1 Drawing Sheet

LOW THERMAL EXPANSION GLASS FOR EUVL APPLICATIONS

CROSS-REFERENCE TO RELATED APPLICATIONS

This application claims the benefit of U.S. Provisional Application No. 61/237,895, filed 28 Aug. 2009.

BACKGROUND

1. Technical Field

The invention relates generally to low thermal expansion glass for extreme ultraviolet lithography (EUVL) applications.

2. Description of Related Art

Optical lithography systems have a system resolution, RES, that is a function of three parameters: process-related factor $k_1$, wavelength of exposure light $\lambda$, and numerical aperture NA. Equation (1) below shows the relationship between RES, k1, $\lambda$, and NA.

$$RES = k_1 \frac{\lambda}{NA} \quad (1)$$

The value of RES determines the smallest feature that can be printed by the system. The smaller the value of RES, the smaller the feature that can be printed. RES is inversely proportional to NA and directly proportional to $k_1$ and $\lambda$. Therefore, a combination of decreasing $k_1$ and $\lambda$ and increasing NA can be used to decrease the value of RES. However, $k_1$, $\lambda$, and NA cannot be changed infinitely or haphazardly because of process and material limitations and because the choice of $\lambda$ and NA also affects the depth of focus (DOF), as shown in Equation (2).

$$DOF = \pm k_2 \frac{\lambda}{(NA)^2} \quad (2)$$

In Equation (2), $k_2$ is a process-related factor. In general, a large DOF is desired, which would require a combination of increasing $k_2$ and $\lambda$ and decreasing NA—this is opposite to the strategy for decreasing RES.

Thus far, exposure wavelength $\lambda$ has offered the most opportunities for change, with current lithography systems having progressed from 248 nm to 193 nm to 157 nm. At an exposure wavelength of 13 nm, EUVL is a giant leap forward from the current lithographic systems and offers a higher resolution and larger depth of focus than possible with current lithographic systems. EUVL tools are geared towards printing of feature sizes below 100-nm. However, commercialization of EUVL tools has not been easy. For instance, extreme ultraviolet (EUV) radiation is readily absorbed by virtually all known materials, which makes it impossible to adapt the refractive optics used in current lithography systems for EUVL systems. Reflective optics and masks have had to be developed for EUVL systems. These reflective optics and masks typically include reflective multilayer (ML) coatings on a substrate. A reflective multilayer consists of alternating layers of high-reflectance and low-reflectance materials, typically alternating layers of Mo and Si or Mo and Be.

Substrate materials for EUV reflective optics and masks are required to meet stringent requirements with respect to coefficient of thermal expansion (CTE) and surface roughness since any expansion or waviness in these materials during printing can distort the printing of features. For reflective imaging optics and masks especially, it is important that the substrate has a near-zero CTE at the application temperature. Glass or glass-ceramic with a low CTE is typically used as the substrate material. ZERODUR® glass-ceramic, made by Schott AG, and Ultra-Low Expansion (ULE®) glass, made by Corning Incorporated, have been identified as substrate materials for EUVL applications. ULE® glass is a titania-silicate glass with a titania ($TiO_2$) content in a range from 5 to 10 wt %. Code 7972 ULE® glass has a mean CTE of 0±30 ppb/° C. at 5° C. to 35° C. ULE® glass is also highly polishable. U.S. Patent Publication Application No. 2008/0132150 A1 (Arserio et al.) describes a method for polishing ULE glass to a high-spatial frequency roughness of less than 0.20 nm rms. Typically, a high-spatial frequency roughness in a range from 0.005 to 0.30 nm rms is desired for EUVL applications.

CTE changes with temperature. Zero-CTE crossover of a material is the temperature at which the CTE of the material is 0 ppb/° C. Currently, the EUVL community wishes for a glass material having 0±5 ppb/° C. at 20° C. Code 7972 ULE® glass meets this criterion with a zero-CTE crossover at 20° C. Code 7972 ULE® glass also has a stable thermal expansion in the temperature range of approximately 0° C. to 40° C., which works well for the current generation of EUVL applications. With the next generation EUVL applications of higher power energy sources and increased thermal gradients, the specifications for EUV material will become more stringent. For these next generation EUVL applications, a low thermal expansion glass having a stable thermal expansion over a wider temperature range than possible with the current ULE® glass and that can be polished to meet surface roughness requirements is desired.

SUMMARY

Thus, according to one aspect of the present invention, a low thermal expansion glass comprises a base glass material having a front surface, a back surface and a thickness and a glass coating material applied on at least the front surface of the base glass material. The base glass material consists essentially of 10 wt % to 20 wt % titania and 80 wt % to 90 wt % silica. The glass coating material also consists essentially of titania and silica. However, the total amount of titania in the glass coating material is lower than the total amount of titania in the base glass material.

In another aspect of the present invention, a silica-titania glass element suitable for extreme ultraviolet lithography applications consists of 12 wt % to 20 wt % titania and 80 wt % to 88 wt % silica and has a coefficient of thermal expansion of essentially 0 ΔL/L in a temperature range of −20° C. to +100° C.

These and other aspects and embodiments of the present invention are described in detail below.

DETAILED DESCRIPTION

Figure 1:
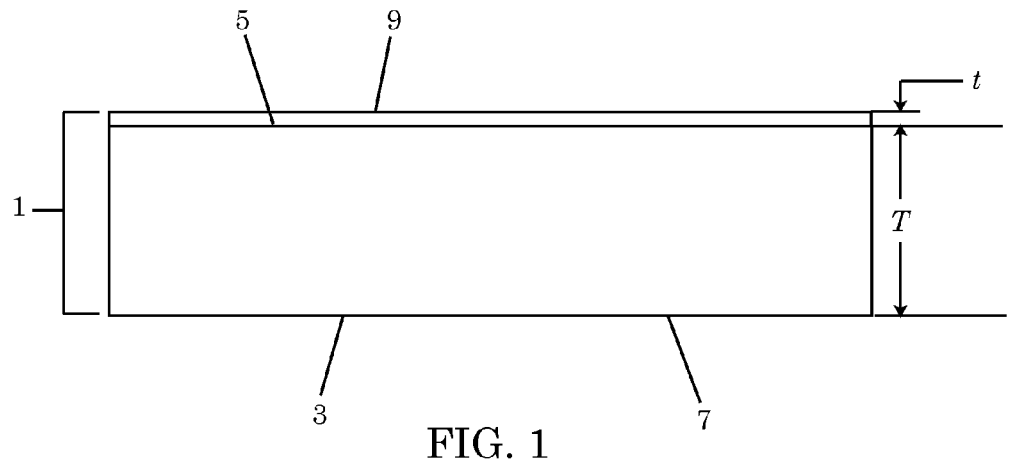
FIG. 1 is a schematic of a low thermal expansion glass according to one embodiment of the invention.

The present invention will now be described in detail, with reference to the accompanying drawings. In this detailed description, numerous specific details may be set forth in order to provide a thorough understanding of the invention. However, it will be apparent to one skilled in the art when the invention may be practiced without some or all of these specific details. In other instances, well-known features and/or process steps may not be described in detail so as not to unnecessarily obscure the invention. In addition, like or identical reference numerals may be used to identify common or similar elements.

In one aspect, the present invention provides a silica-titania glass element suitable for use in current- and next-generation EUVL applications. In another aspect, the present invention provides a low thermal expansion glass suitable for use as substrate material in current- and next-generation EUVL applications. The low thermal expansion glass can be used in stages, mirrors, masks, and housing. In a preferred embodiment, the silica-titania glass element and the low thermal expansion glass have a stable thermal expansion over a temperature use range of approximately −20° C. to +100° C. In another preferred embodiment, the silica-titania glass element and the low thermal expansion glass have a stable thermal expansion over a temperature use range of approximately −20° C. to +150° C. In a preferred embodiment, the stable thermal expansion includes a CTE of essentially zero over the given temperature use range.

FIG. 1 shows a low thermal expansion glass 1 including a base glass material 3 having a front surface 5, a back surface 7, and a thickness T. The low thermal expansion glass 1 includes a glass coating material 9 applied on the front surface 5 of the base glass material 3. The glass coating material 9 may also be applied to the back surface 7 of the base glass material 3. The glass coating material 9 is made of a highly-polishable glass. In a preferred embodiment, the glass coating material 9 can be polished to a surface roughness of less than 0.2 nm rms. In a preferred embodiment, the glass coating material 9 is polished and exhibits a high-spatial frequency roughness in a range from 0.005 to 0.3 nm rms. The glass coating material 9 has a thickness t, but the thickness t of the glass coating material 9 is not so large as to significantly affect the thermal stability of the base glass-ceramic material 3 over a temperature use range. Preferably, the thickness t of the glass coating material 9 is much less than the thickness T of the base glass material 3. The thickness of the glass coating material will typically be in a range from 1 μm to 500 μm after polishing. In a preferred embodiment, the thickness of the glass coating material is in a range of 1 μm to 200 μm. In a preferred embodiment, the glass coating material 9 essentially contains titania ($TiO_2$) and silica ($SiO_2$), with the content of $TiO_2$ in the glass being greater than 0 percent by weight (wt %) and less than 12 wt %. An example of such a glass is available as ULE® glass from Corning Incorporated. In a preferred embodiment, the glass coating material 9 essentially contains titania ($TiO_2$) and silica ($SiO_2$), with the content of $TiO_2$ in the glass in a range from 5 wt % to 10 wt %. In another preferred embodiment, the glass coating material essentially contains titania ($TiO_2$) and silica ($SiO_2$), with the content of $TiO_2$ in the glass in a range from 7 wt % to 9 wt %.

The base glass material 3 has a stable thermal expansion over a given temperature range. The term "stable thermal expansion" means that the glass has an essentially constant CTE over the specified temperature range. The base glass material 3 essentially contains titania and silica, with the amount of titania in the base glass material 3 being at least 10 wt % and the remainder being essentially silica. In a preferred embodiment, the base glass material 3 consists essentially of a silica-titania glass containing 12 wt % to 20 wt % titania and 80 wt % to 88 wt % silica. In another preferred embodiment, the total amount of titania in the base glass material 3 is in a range from 12 wt % to 17 wt %. Thus, the essential components of the preferred base glass material 3 are the same as that of the preferred glass coating material 9, with the exception that the $TiO_2$ content of the base glass material 3 is selected to be higher than the $TiO_2$ content of the glass coating material 9. It turns out that $TiO_2$ content affects polishability of $TiO_2$—$SiO_2$ glass. In particular, $TiO_2$—$SiO_2$ glass having a $TiO_2$ content in a range from 12 wt % to 20 wt % is typically more difficult to polish than $TiO_2$—$SiO_2$ glass having a $TiO_2$ content in a range from 5 wt % to 10 wt %, as will be further discussed below. However, in one aspect of the present invention, by applying the glass coating material 9 on the base glass material 3, a polishable or polished low expansion thermal glass having a stable thermal expansion over a given temperature use range can be obtained, with the polishing being performed on the glass coating material 9 rather than the base glass material 3. As will be further described below in another aspect of the present invention, it may also be possible to polish an uncoated $TiO_2$—$SiO_2$ glass having a high $TiO_2$ content, e.g., 12 wt % to 20 wt %, to a level suitable for EUVL applications provided that the uncoated base $TiO_2$—$SiO_2$ glass meets certain criteria with respect to the structure of the titania in the glass.

Figure 2:
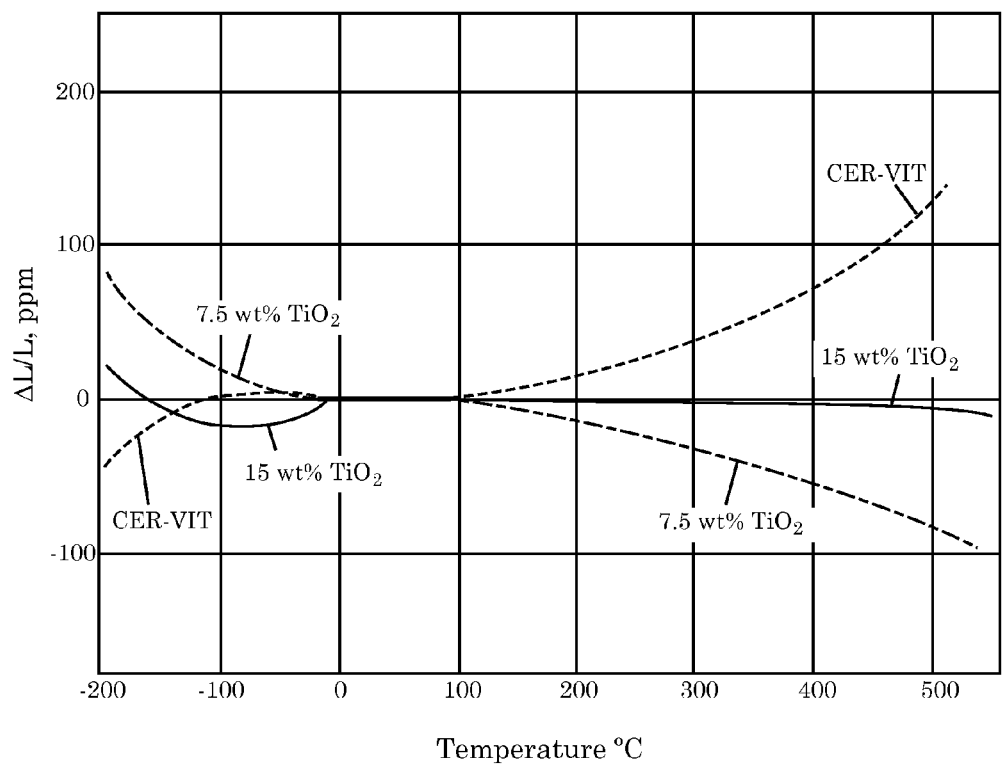
FIG. 2 is a graph showing expansivity curves of a silica-titania glass-ceramic containing 15 wt % titania, a silica-titania glass containing 7.5 wt % titania, and a lithium-aluminosilicate glass-ceramic.

U.S. Pat. No. 3,690,855 (Schultz) discloses a binary glass essentially containing $TiO_2$ and $SiO_2$, with the $TiO_2$ content being in a range from approximately 12 wt % to 20 wt %. Schultz discloses that the binary glass consisting essentially of $TiO_2$ and $SiO_2$ with the $TiO_2$ content being in a range from approximately 12 wt % to 20 wt % has a negative CTE in the non-annealed state over the range of −200° C. to +700° C. Schultz further discloses that the glass having the negative CTE in the non-annealed state can be annealed by heat-treating at a temperature between 700° C. and the softening point of the glass to cause an increase in the CTE of the glass within the temperature range of −200° C. to +700° C. This means that the $TiO_2$—$SiO_2$ glass with the 12 wt % to 20 wt % $TiO_2$ can be annealed to achieve a zero CTE within the temperature range of −200° C. to +700° C. Schultz discloses a $TiO_2$—$SiO_2$ glass containing 15 wt % $TiO_2$ and 85 wt % $SiO_2$, which after heat treatment at 900° C., exhibited a substantially zero CTE over an entire measured range of −200° C. to +500° C. FIG. 2 shows the expansivity curve for the $TiO_2$—$SiO_2$ glass containing 15 wt % $TiO_2$ and 85 wt % $SiO_2$ after annealing.

In one or more embodiments, the base glass-ceramic material 3 of FIG. 1 is made by preparing a $TiO_2$—$SiO_2$ glass with the appropriate $TiO_2$ content as described above. The $TiO_2$—$SiO_2$ glass is annealed by heat-treatment to achieve a desired CTE within a range of −200° C. to +700° C. In a preferred embodiment, the base glass material 3 essentially has a zero CTE within a range of approximately 10° C. to 100° C. In another preferred embodiment, the base glass material 3 essentially has a zero CTE within a range of approximately −20° C. to 100° C. "Essentially zero CTE" typically means 0+/−5 ppb/K. In another preferred embodiment, the base glass material 3 has a CTE of 0+/−5 ppb/K at 20° C. and a slope of coefficient of thermal expansion versus temperature of less than 1 ppb/$K^2$ over a temperature range of 10° C. to 80° C. However, the above specified temperature ranges for zero CTE does not preclude the base glass material 3 from having a zero CTE over a wider temperature range. In general, the base glass material 3 may have a zero CTE over a range of temperatures within the range of −200° C. to +700° C.

Prior to annealing, the $TiO_2$—$SiO_2$ glass for the base glass material 3 can be prepared using any known method for preparing high-quality glass in the art, e.g., flame hydrolysis process, vapor deposition processes, or sol-gel process. The glass coating material 9 is applied on the front surface 5, and optionally the back surface 7, of the base glass material 3 as a thin film. The glass coating material 9 can be applied to the base glass material 3 before or after heat treating the $TiO_2$—$SiO_2$ glass to achieve the desired CTE. The glass coating material 9 may be applied on the $TiO_2$—$SiO_2$ glass, or glass-ceramic, by techniques such as sol-gel or vapor deposition in a second step of manufacturing. Alternately, the glass coating material 9 may be applied by vapor deposition or flame hydrolysis in a one-step manufacturing process by changing the fume stream composition, i.e., if the $TiO_2$—$SiO_2$ glass is also being made by vapor deposition or flame hydrolysis. Alternatively, the glass coating material 9 can be bonded to the base glass material 3 via various bonding techniques, such as optical bonding, low temperature fusion bonding, and frit bonding.

Earlier on it was mentioned that $TiO_2$ content affects polishability of a $TiO_2$—$SiO_2$ glass. In particular, $TiO_2$—$SiO_2$ glass having a titania content of 12 wt % to 20 wt % has been found to be difficult to polish to a low surface roughness. Without being held to any particular theory, it is believed that in $TiO_2$—$SiO_2$ glass having 12 wt % to 20 wt % titania, at least a portion of the titania is in a six-fold coordination state during formation of the $TiO_2$—$SiO_2$ glass or as a result of any heat treatments given to the glass, whereas in concentrations below 12 wt %, and particularly below 10 wt %, the titania is in a four-fold coordination and tends to remain in this state. As a result, during consolidation of the $TiO_2$—$SiO_2$ glass, the six-fold coordinated titania is not perfectly incorporated into the glass or causes a discontinuity, or small crystal formation (observed when the titania content is over about 17 wt %), in the glass structure, and when the $TiO_2$—$SiO_2$ glass is polished the presence of the discontinuity or crystals at the polished surface increases the roughness of the glass. As a result, the $TiO_2$—$SiO_2$ glass having a titania content of 12 wt % to 20 wt % is not as well suited for certain EUV optics such as mirrors as a $TiO_2$—$SiO_2$ glass having a titania content of less than 12 wt %. However, other properties of the 12 wt % to 20 wt % $TiO_2$—$SiO_2$ glass, such as its being stable to the higher temperatures encountered in some EUVL applications, make it a more desirable material for these applications than the 5-10 wt % $TiO_2$—$SiO_2$ glass. As described above, the polishability of a 12 wt % to 20 wt % $TiO_2$—$SiO_2$ glass can be improved to the point where the glass is suitable for EUVL application by placing a coating of a $TiO_2$—$SiO_2$ glass having less than 12 wt % titania on the surfaces of the glass prior to polishing. In some embodiments the titania content of the coating glass is in the range of 5 wt % to 10 wt %. The coating glass smoothes out the roughness of the 12 wt % to 20 wt % $TiO_2$—$SiO_2$ glass such that when polished, parts having a coating of 5-10 wt % $TiO_2$—$SiO_2$ glass on a base of 12-20 wt % $TiO_2$—$SiO_2$ glass are suitable for EUVL applications by virtue of the coated parts having a lower surface roughness. This is particularly important in the case of mirrors for reflective optics.

FIG. 2 shows the expansivity of a $TiO_2$—$SiO_2$ glass of U.S. Pat. No. 3,390,855 having 15 wt % $TiO_2$ and 85 wt % $SiO_2$. FIG. 2 further shows the expansivity of a 7.5 wt % ULE® glass (nominal 7.5 wt % $TiO_2$, 92.5 wt % $SiO_4$), available from Corning Incorporated, and CER-VIT® glass-ceramic (lithium aluminosilicate), available from Owens-Illinois, Toledo, Ohio. For both the CER-VIT® glass-ceramic and the 7.5 wt % $TiO_2$ ULE® glass, the substantially "flat" expansivity range is approximately −50° C. to approximately +90° C. Coating the 15 wt % $TiO_2$ glass with a $TiO_2$—$SiO_2$ glass containing less than 12 wt % titania, and in some embodiments less than 10 wt % titania, provides a substrate consisting of a base glass with a coating on the surfaces. The coated surface can be polished to the required roughness values, and the polished substrate will have the thermal stability required for advanced EUV system applications. The glass coating material, while applied on the base glass material, can be polished to achieve a polished low thermal expansion glass. The glass coating material may be polished to a desired surface roughness, e.g., a mid-spatial frequency of peak-to-valley roughness less than 10 nm and a high-spatial frequency roughness of in a range from 0.005 to 0.30 nm rms. The glass coating material may be polished using an abrasive slurry, as described, for example, in U.S. Patent Publication No. 2008/0132150 A1 (Arserio et al.).

In certain embodiments, uncoated 12 wt % to 20 wt % $TiO_2$—$SiO_2$ glass can be polished to have a surface roughness of less than 0.2 nm rms. In these embodiments, particularly where the glass can be polished to a mid-spatial frequency of peak-to-valley roughness less than 10 nm and a high-spatial frequency roughness of in a range from 0.005 to 0.30 nm rms, the application of a coating of $TiO_2$—$SiO_2$ glass containing less than 10 wt % $TiO_2$ on the base glass is optional. The polished, uncoated glass will provide a stable thermal expansion over a temperature range of approximately −20° C. to approximately +100° C. Without being held to any particular theory, it is believed that 12 wt % to 20 wt % $TiO_2$—$SiO_2$ glass itself can be polished to a surface roughness of less than 0.2 nm rms when the $TiO_2$—$SiO_2$ soot is laid down during glass formation such that the formation of six-fold coordinated $TiO_2$ is minimized or is zero. That is, all or essentially all of the $TiO_2$ in the silica-titania glass is four-coordinate $TiO_2$.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A low thermal expansion glass, comprising:
    a base glass material having a front surface, a back surface, and a thickness, the base glass material consisting essentially of 10 wt % to 20 wt % titania and 80 wt % to 90 wt % silica; and
    a glass coating material applied on at least the front surface of the base glass material, the glass coating material consisting essentially of titania and silica, a total amount of titania in the glass coating material being lower than the total amount of titania in the base glass material;
    wherein the glass coating material is polished and exhibits a high-spatial frequency roughness in a range from 0.005 to 0.3 nm rms.

2. The low thermal expansion glass of claim 1, wherein the total amount of titania in the glass coating material is less than 12 wt %.

3. The low thermal expansion glass of claim 1, wherein the total amount of titania in the glass coating material is in a range from 5 wt % to 10 wt %.

4. The low thermal expansion glass of claim 1, wherein the total amount of titania in the glass coating material is in a range from 7 wt % to 9 wt %.

5. The low thermal expansion glass of claim 1, wherein the total amount of titania in the base glass material is at least 12 wt %.

6. The low thermal expansion glass of claim 5, wherein the base glass material has a coefficient of thermal expansion that is essentially zero in a temperature range from approximately 10° C. to 100° C.

7. The low thermal expansion glass of claim 6, wherein the total amount of titania in the glass coating material is in a range from 5 wt % to 10 wt %.

8. The low thermal expansion glass of claim 5, wherein the base glass material has a coefficient of thermal expansion that is 0+/−5 ppb/K at 20° C. and a slope of coefficient of thermal expansion versus temperature of less than 1 ppb/K$^2$ over a temperature range of 10° C. to 80° C.

9. The low thermal expansion glass of claim 8, wherein the total amount of titania in the glass coating material is in a range from 7 wt % to 9 wt %.

10. The low thermal expansion glass of claim 1, wherein the total amount of titania in the glass coating material is in a range from 12 wt % to 17 wt %.

11. The low thermal expansion glass of claim 1, wherein a thickness of the glass coating material is less than a thickness of the base glass material.

12. The low thermal expansion glass of claim 11, wherein the thickness of the glass coating material is in a range from 1 μm to 500 μm.

13. The low thermal expansion glass of claim 12, wherein the total amount of titania in the glass coating material is in a range from 5 wt % to 10 wt %.

14. The low thermal expansion glass of claim 11, wherein the thickness of the glass coating material is in a range from 1 μm to 200 μm.

15. The low thermal expansion glass of claim 14, wherein the total amount of titania in the glass coating material is in a range from 7 wt % to 9 wt %.

16. A silica-titania glass element suitable for extreme ultraviolet lithography applications, the silica-titania glass element consisting of 12 wt % to 20 wt % titania and 80 wt % to 88 wt % silica and having a coefficient of thermal expansion of essentially 0 ΔL/L in a temperature range of −20° C. to +100° C., wherein the 12 wt % to 20 wt % titania consists of four-coordinate titania.

17. The silica-titania glass element of claim 16, having at least one surface polished to a surface roughness less than 0.2 nm rms.

18. The silica-titania glass element of claim 16, which consists of 12 wt % to 16 wt % titania and 80 wt % to 84 wt % silica.

19. A low thermal expansion glass, comprising:
a base glass material having a front surface, a back surface, and a base glass thickness, the base glass material consisting essentially of 10 wt % to 20 wt % titania and 80 wt % to 90 wt % silica, the base glass material having a coefficient of thermal expansion that is essentially zero in a temperature range from approximately 10° C. to 100° C.; and
a glass coating material applied on at least the front surface of the base glass material, the glass coating material having a glass coating thickness less than the base glass thickness, the glass coating material consisting essentially of titania and silica, a total amount of titania in the glass coating material being lower than the total amount of titania in the base glass material.

* * * * *